US011153807B2

(12) United States Patent
Rune et al.

(10) Patent No.: US 11,153,807 B2
(45) Date of Patent: Oct. 19, 2021

(54) TIMING INFORMATION FOR ACCESS INFORMATION TABLE TRANSMISSION

(71) Applicant: Telefonaktiebolaget LM Ericsson (publ), Stockholm (SE)

(72) Inventors: Johan Rune, Lidingö (SE); Icaro L. J. da Silva, Solna (SE); Gunnar Mildh, Sollentuna (SE); Jose Luis Pradas, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 138 days.

(21) Appl. No.: 16/075,183

(22) PCT Filed: Feb. 5, 2016

(86) PCT No.: PCT/EP2016/052538
§ 371 (c)(1),
(2) Date: Aug. 3, 2018

(87) PCT Pub. No.: WO2017/133792
PCT Pub. Date: Aug. 10, 2017

(65) Prior Publication Data
US 2019/0045424 A1 Feb. 7, 2019

(51) Int. Cl.
*H04W 48/10* (2009.01)
*H04W 52/02* (2009.01)
(Continued)

(52) U.S. Cl.
CPC ........... *H04W 48/10* (2013.01); *H04W 48/12* (2013.01); *H04W 48/16* (2013.01);
(Continued)

(58) Field of Classification Search
CPC . H04W 48/10; H04W 48/12; H04W 72/1205; H04W 72/0453; H04W 72/0446;
(Continued)

(56) References Cited

U.S. PATENT DOCUMENTS

2009/0227255 A1* 9/2009 Thakare ................ H04W 48/10
455/434
2011/0319081 A1* 12/2011 Deivasigamani ..... H04W 24/08
455/436
(Continued)

FOREIGN PATENT DOCUMENTS

| WO | 2013062914 A1 | 5/2013 |
| WO | 2013077783 A1 | 5/2013 |
| WO | 2016153399 A1 | 9/2016 |

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 12)", Technical Specification, 3GPP TS 36.331 V12.7.0, Sep. 1, 2015, pp. 1-453, 3GPP, France.
(Continued)

*Primary Examiner* — Alex Skripnikov
*Assistant Examiner* — Sharmin Chowdhury
(74) *Attorney, Agent, or Firm* — Sage Patent Group

(57) ABSTRACT

An access node (111, 112) of a cellular network transmits an identifier (502, 505) enabling selection of access information from an access information table. The access information is applicable by a radio device (10) for accessing the cellular network. Further, the access node transmits (501, 504) timing information indicating a time of a next transmission of the access information table. Depending on the timing information, the radio device (10) may decide whether to switch to another carrier frequency or to wait on a currently used carrier frequency to receive the access information table.

11 Claims, 12 Drawing Sheets

(51) Int. Cl.

| | |
|---|---|
| *H04W 48/12* | (2009.01) |
| *H04W 48/16* | (2009.01) |
| *H04W 72/04* | (2009.01) |
| *H04W 72/12* | (2009.01) |
| *H04W 74/00* | (2009.01) |

(52) U.S. Cl.
CPC ... *H04W 52/0229* (2013.01); *H04W 52/0274* (2013.01); *H04W 72/0446* (2013.01); *H04W 72/0453* (2013.01); *H04W 72/1205* (2013.01); *H04W 72/0466* (2013.01); *H04W 74/006* (2013.01); *Y02D 30/70* (2020.08)

(58) Field of Classification Search
CPC ............. H04W 52/0274; H04W 48/16; H04W 52/0229; H04W 74/006; H04W 72/0466; Y02D 70/1262
See application file for complete search history.

(56) References Cited

U.S. PATENT DOCUMENTS

| | | | | |
|---|---|---|---|---|
| 2012/0328040 | A1* | 12/2012 | Callard | H04B 7/0689 375/267 |
| 2015/0208327 | A1* | 7/2015 | Baratam | H04W 48/16 455/432.1 |
| 2016/0029179 | A1* | 1/2016 | Kim | H04W 72/005 370/312 |

OTHER PUBLICATIONS

Ericsson, "Index based provisioning of system information in NR", 3GPP TSG-RAN WG2 #95, Göteborg, Sweden, Aug. 21, 2016, pp. 1-3, Tdoc R2-165550, 3GPP.

Frenger, P., "A Clean Slate Radio Network Designed for Maximum Energy Performance", 2014 IEEE 25th Annual International Symposium on Personal, Indoor, and Mobile Radio Communication (PIMRC), Sep. 2, 2014, pp. 1300-1304, IEEE.

Office Action issued in corresponding EP Application No. 16703143.4 dated Apr. 14, 2020, 23 Pages. The references cited therein have previously been made of record.

* cited by examiner

TIMING INFORMATION FOR ACCESS INFORMATION TABLE TRANSMISSION

TECHNICAL FIELD

The present invention relates to methods for controlling access to a cellular network and to corresponding devices.

BACKGROUND

When in a cellular network based on the LTE (Long Term Evolution) radio access technology (RAT) specified by 3GPP (3rd Generation Partnership Project) a UE (user equipment) initially accesses the cellular network, the UE needs to acquire what is called system information (SI). This is typically accomplished via broadcast of a certain information in each cell. The broadcasted information includes a primary synchronization signal (PSS) and a secondary synchronization signal (SSS), which may be used by the UE to obtain frequency and time synchronization. These sequences also encode the physical cell identity (PCI). After the physical layer synchronization and PCI detection, the UE is capable of performing channel estimation using the constantly broadcasted cell specific reference signals (C-RSs) and, consequently, finally decode the SI. The PSS and SSS are respectively transmitted in the first and sixth subframes within a radio frame. Accordingly, the PSS/SSS and C-RSs are always broadcasted by the network. These are used by the UE to synchronize to a given cell and enabling channel estimation.

The SI is broadcasted in each cell by System Information Blocks (SIBs), each of which contains a set of functionally related parameters. The SIB types that have been defined include a Master Information Block (MIB), which includes a limited number of the most frequently transmitted parameters which are essential for the UE's initial access to the network, a System Information Block Type 1 (SIB1), which contains parameters needed to determine if a cell is suitable for cell selection, as well as information about time-domain scheduling of the other SIBs, a System Information Block Type 2 (SIB2), which includes common and shared channel information, System Information Blocks of Type 3 to 8 (SIB3-SIB8), which include parameters used to control intra-frequency, inter-frequency and inter-RAT cell reselection, System Information Block Type 9, which is used to signal the name of a Home eNodeB (HeNB), System Information Blocks of Type 10 to 12 (SIB10-SIB12), which includes Earthquake and Tsunami Warning Service (ETWS) notifications and Commercial Mobile Alert System (CMAS) warning messages, System Information Block Type 13 (SIB13), which includes MBMS (Multimedia Broadcast Multicast Service) related control information, System Information Block Type 14 (SIB14), which is used to configure Extended Access Barring (EAB), System Information Block Type 15 (SIB15), which is used to convey MBMS mobility related information, and System Information Block Type 16 (SIB16), which is used to convey time related information, e.g. the Coordinated Universal Time (UTC). This list of SIB types has been expanding over the years, and this expansion may be expected to continue as the 3GPP LTE RAT evolves.

As can be seen, the way of transmitting the SI in the LTE RAT may result in a significant amount of signals which are constantly broadcasted.

To increase efficiency of fifth generation (5G) cellular networks, a concept was suggested which is based on a layered transmission of access information (see, e.g., "A Clean Slate Radio Network Designed for Maximum Energy Performance" by P. Frenger et al., presented on the IEEE 25th Annual International Symposium on Personal, Indoor, and Mobile Radio Communications (PIMRC), Washington, D.C., Sep. 2-5, 2014). In this concept, user equipments (UEs) are provided with access information by using broadcasted access information tables (AITs) and broadcasted system signature sequences (SSSs), wherein each SSS may be used to identify information from the broadcasted AIT. The AIT may for example define settings concerning how a UE shall access the system, e.g., by a random access procedure, concerning how the UE can be reached by the system in a paging procedure, or concerning more advanced settings, such as related to beam forming or link adaptation. The AITs are typically transmitted with long periods, while the SSSs are typically transmitted more frequently. Typically each access node (e.g., a base station) will transmit an SSS which allows the UE to identify the access information applicable to this access node from the AIT. The AITs do not need to be transmitted by every access node. For example, a base station serving a macro cell may transmit both an AIT and an SSS, while a base station serving a small cell within a coverage region of the macro cell may transmit only an SSS. Accordingly, the AIT will typically include entries defining various configurations which apply to various access nodes. The AIT may therefore have considerable size, so that in view of resource efficiency it is generally desirable to broadcast the AIT at a relatively low update rate.

However, when broadcasting the AIT at a low update rate, it may take some time until a UE has received an AIT and can access the cellular network, specifically in cases where the UE needs to scan multiple carrier frequencies in order to receive one or more AITs.

Accordingly, there is a need for techniques which allow for efficiently receiving one or more AITs including access information to be applied by a UE when accessing a cellular network.

SUMMARY

According to an embodiment of the invention, a method of controlling access to a cellular network is provided. According to the method, an access node of the cellular network transmits an identifier enabling selection of access information from an access information table. The access information is applicable by radio devices for accessing the cellular network. Further, the access node transmits timing information indicating a time of a next transmission of the access information table.

According to a further embodiment of the invention, a method of controlling access to a cellular network is provided. According to the method, a radio device receives, on a first carrier frequency, first timing information indicating a time of a next transmission of a first access information table on the first carrier frequency. The first access information table comprises first access information to be applied by radio devices for accessing the cellular network. Depending on the received first timing information, the radio device selects between, on the one hand, waiting on the first carrier frequency until the time of the next transmission of the first access information table to receive the first access information table on the first carrier frequency and, on the other hand, switching to a second carrier frequency.

According to a further embodiment of the invention, an access node for a cellular network is provided. The access node is configured to transmit an identifier enabling selection of access information from an access information table.

The access information is applicable by radio devices for accessing the cellular network. Further, the access node is configured to transmit timing information indicating a time of a next transmission of the access information table.

According to a further embodiment of the invention, a radio device is provided. The radio device is configured to receive, on a first carrier frequency, first timing information indicating a time of a next transmission of a first access information table on the first carrier frequency. The first access information table comprises first access information to be applied by radio devices for accessing the cellular network. Further, the radio device is configured to, depending on the received first timing information, select between, on the one hand, waiting on the first carrier frequency until the time of the next transmission of the first access information table to receive the first access information table on the first carrier frequency and, on the other hand, switching to a second carrier frequency.

According to a further embodiment of the invention, a computer program or computer program product is provided, e.g., in the form of a non-transitory storage medium, which comprises program code to be executed by at least one processor of an access node of a cellular network. Execution of the program code causes the access node to transmit an identifier enabling selection of access information from an access information table. The access information is applicable by radio devices for accessing the cellular network. Further, execution of the program code causes the access node to transmit timing information indicating a time of a next transmission of the access information table.

According to a further embodiment of the invention, a computer program or computer program product is provided, e.g., in the form of a non-transitory storage medium, which comprises program code to be executed by at least one processor of a radio device. Execution of the program code causes the radio device to receive, on a first carrier frequency, first timing information indicating a time of a next transmission of a first access information table on the first carrier frequency. The first access information table comprises first access information to be applied by radio devices for accessing the cellular network. Further, execution of the program code causes the radio device to, depending on the received first timing information, select between, on the one hand, waiting on the first carrier frequency until the time of the next transmission of the first access information table to receive the first access information table on the first carrier frequency and, on the other hand, switching to a second carrier frequency.

Details of such embodiments and further embodiments will be apparent from the following detailed description of embodiments.

DETAILED DESCRIPTION OF EMBODIMENTS

Figure 1:
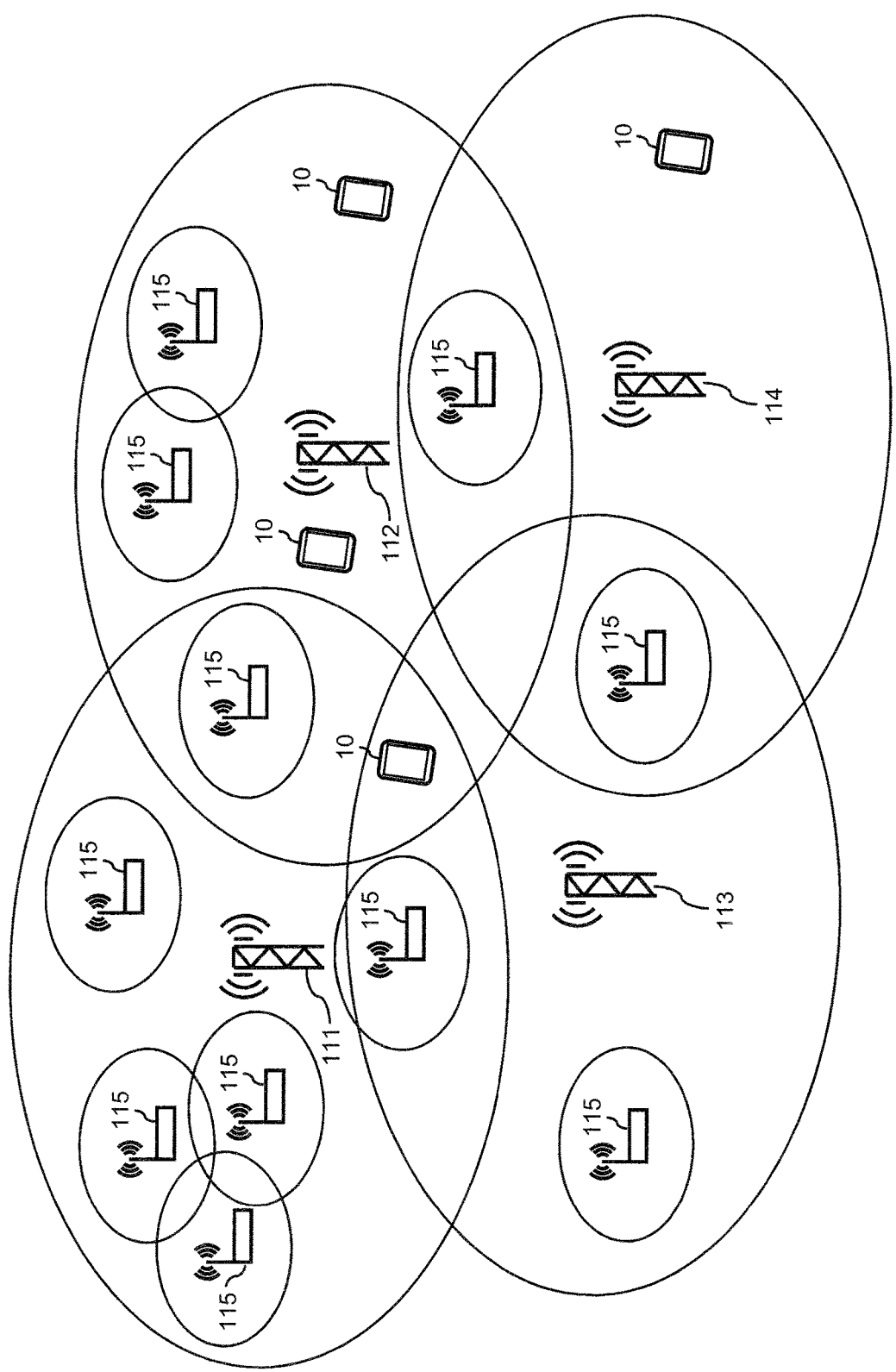
FIG. 1 schematically illustrates a cellular network architecture in which AIT based access control is implemented according to an embodiment of the invention.

In the following, concepts in accordance with exemplary embodiments of the invention will be explained in more detail and with reference to the accompanying drawings. The illustrated embodiments relate to control of access to a cellular network by communication devices, in the following also referred to as UEs. In the illustrated examples, it is assumed that information which is utilized by the UEs for accessing the cellular network is provided in a layered manner to the UEs. Specifically, AITs are transmitted by some access nodes of the cellular network to the UEs. The AITs include entries which are each identified by an identifier, and each of such entries includes one or more parameters of a configuration which may be selected by the UE to be applied when accessing the cellular network, in particular a certain cell or access node of the cellular network. In this respect, a "cell" may be defined as a certain coverage region served by at least one corresponding access node. A cellular network may be defined as a wireless communication network with multiple access nodes, each serving a corresponding coverage area or cell. The identifier may correspond to a system signature sequence as transmitted by an access node of the cellular network. The access nodes each transmit such an identifier, and the UEs may utilize this transmitted identifier to identify an entry of the AIT which includes access information that is applicable for the specific access node or for a cell controlled by this access node. The system signature sequence may encode an index which typically differs between different access nodes. In the following, the identifier is thus also referred to as SSI (System Signature Index). The AITs do not need to be transmitted by every access node. That is to say, there may be access nodes which transmit the identifier, but no AIT. The UEs may then utilize the transmitted identifier to identify an AIT entry of an AIT transmitted by another access node. Further, the AITs may be transmitted less frequently than the identifiers. Accordingly, changes in the way of utilizing a certain access node for accessing the cellular network may be indicated by modifying the identifier transmitted by this access node. The cellular network may for example be based on a 5G radio access technology, such as an evolution of the LTE RAT. However, it is to be understood that the illustrated concepts could also be applied to other RATs.

In the illustrated concepts, timing information is transmitted to the UEs to indicate a time at which a next transmission of an AIT is to be expected. The timing information may for example be transmitted in the form of a countdown indicator, indicating a remaining time until the next transmission of the AIT. However, other forms of indicating the time of the next transmission of the AIT could be utilized as well, e.g., an indication in terms of absolute system time. In some cases, the timing information may also include information on a period of repeatedly transmitting the AIT.

The timing information is assumed to be transmitted on each carrier frequency on which an AIT is transmitted. In the examples as explained in the following, it is assumed that the timing information is transmitted in conjunction with or even integrated with the SSI. However, it is to be understood that other signals could be used alternatively or in addition for conveying the timing information. Similar to the SSI, the timing information may thus be transmitted more frequently than the AIT itself. Further, an access node may transmit the SSI, the timing information and the AIT on a given carrier frequency. However, in some scenarios an access node could also transmit the SSI and timing information, but not the AIT on a given carrier frequency. In the latter case, one or more other access nodes could be responsible for the transmission of the AIT on this carrier frequency.

The timing information may be transmitted in a broadcast mode. To allow efficient usage of resources, the timing information may at least in part be encoded by selecting a certain scrambling sequence form a set of different scrambling sequences. In addition or as an alternative, the timing information may also be compressed in another way.

The UE may utilize the timing information to improve efficiency when scanning different carrier frequencies for the transmission of the AIT. Specifically, depending on the timing information received on a certain carrier frequency, the UE may decide whether there is sufficient time to scan one or more other carrier frequencies before the next transmission of the AIT is expected on this carrier frequency. Having received the timing information for a certain carrier frequency, the UE may switch to this carrier frequency at the time of the next transmission of the AIT on this carrier frequency, and utilize the remaining time for scanning other carrier frequencies (to receive the timing information and/or AIT) on such other carrier frequency or to save energy by entering a sleep mode. Accordingly, obtaining the AITs on multiple carrier frequencies may be expedited and made more resource efficient, e.g. in terms of the UE's energy consumption. This can be useful in the case of initial selection of a PLMN (Public Land Mobile Network) and/or RAT and/or when the UE is turned on or otherwise returns after having been disconnected from the cellular network.

In addition to the above-mentioned timing information, which is transmitted separately from the AIT, also the AIT itself could include timing information, e.g., on a period of repeatedly transmitting the AIT on the given carrier frequency.

FIG. 1 schematically illustrates a cellular network architecture which may be used for implementing the concepts as outlined above. In particular, FIG. 1 illustrates UEs 10 and various access nodes 111, 112, 113, 114, 115 of the cellular network. In the illustrated example, the access nodes 111, 112, 113, 114, 115 are assumed to be base stations 111, 112, 113, 114 serving macro cells and base stations 115 serving small cells, e.g., pico cells or femto cells, within a coverage region of such macro cell.

As mentioned above, the UEs 10 utilize information from AITs received from the cellular network to control their respective access to the cellular network. Such control of the access may for example relate to a random access procedure performed by the UE 10 for gaining initial access to the cellular network or to a paging procedure performed by the cellular network to reach a certain UE 10. Further, the information from the AITs may be utilized by the UE 10 for setting a beam-forming configuration, a link adaptation configuration, and/or a HARQ (Hybrid Automatic Repeat Request) configuration applied when accessing the cellular network. The AIT entry including the access information which is applicable for a specific access node 111, 112, 113, 114, 115 is identified by the UE 10 on the basis of the identifiers transmitted by each access node 111, 112, 113, 114, 115. In the following, it will be assumed that the identifiers correspond to an SSI transmitted by each access node 111, 112, 113, 114, 115.

In the illustrated scenario, it is assumed that the access nodes 111, 112, 113, 114 each utilize different carrier frequencies and repeatedly transmit an AIT on the respective carrier frequency. In the illustrated example, it is assumed that the access node 111, transmits a first AIT, the access node 112 transmits a second AIT, the access node 113 transmits a third AIT, and the access node 114 transmits a fourth AIT. The AITs transmitted by the different access nodes 111, 112, 113, 114 may be different from one another, i.e., include access information which is at least in part different from each other, or may be identical. Further, the timing of transmitting the respective AIT may differ from one of the access nodes 111, 112, 113, 114 to the other. For example, the access node 111 could repeatedly transmit the first AIT with a first period of repetition, and the access node 112 could repeatedly transmit the second AIT with a second period of repetition which is different from the first period of repetition. Further, the access node 111 could repeatedly transmit the first AIT with a first period of repetition, and the access node 112 could repeatedly transmit a second AIT with a second period of repetition which is the same as the first period of repletion, but the transmissions of the first AIT and the second AIT could be offset with respect to each other.

Broadcast transmissions may be utilized for providing the AITs and the SSIs to the UEs 10. Here, a broadcast transmission is considered to be a transmission addressed to all UEs 10 in a certain coverage area of the cellular network. The broadcast transmission may be a single frequency network (SFN) transmission covering multiple cells of the cellular network. However, other transmission modes could be utilized as well, e.g., unicast transmissions or multicast transmissions. Here, a unicast transmission is considered to be a transmission addressed to one specific UE 10 and a multicast transmission is considered as a transmission which is addressed to a certain group of UEs 10. Also the multicast transmission may be an SFN transmission covering multiple cells or an SFN transmission from several synchronized access nodes, e.g., base stations, of the cellular network.

The AITs do not need to be transmitted by each access node 111, 112, 113, 114, 115. In the illustrated example, the AITs are assumed to be transmitted by the access nodes 111, 112, 113, 114 serving the macro cells, thereby ensuring that the AITs can be received throughout the coverage area of the cellular network, but not by the access nodes 115 serving small coverage areas or cells. Further, each of the access nodes 111, 112, 113, 114, 115 broadcasts a corresponding SSI. Here, it is to be understood that the broadcasted SSIs may vary between the access nodes 111, 112, 113, 114, 115. However, it is also possible that certain access nodes 111, 112, 113, 114, 115 broadcast the same SSI, e.g., when similar access parameters apply for these access nodes 111, 112, 113, 114, 115.

Figure 2:
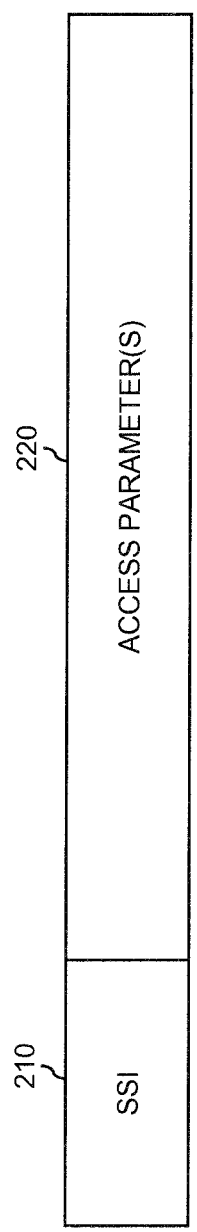
FIG. 2 shows an exemplary entry of an AIT according to an embodiment of the invention.

FIG. 2 schematically illustrates an entry of an AIT, corresponding to a particular configuration which can be used by the UE 10 for accessing the cellular network. As illustrated, the entry includes an SSI 210, and access parameter(s) 220. It should be noted that although the terminology "parameter" is used throughout this application, it should be understood that value(s) or information concerning the parameter(s) are included in the AIT. The SSI 210 in the entry of the AIT may be matched to the SSI received by the UE 10 so as to enable the UE 10 to identify and select the configuration defined by the access parameters 220. The AIT includes a plurality of entries as illustrated in FIG. 2, each defining a particular configuration as applicable to a certain access node.

Figure 3:
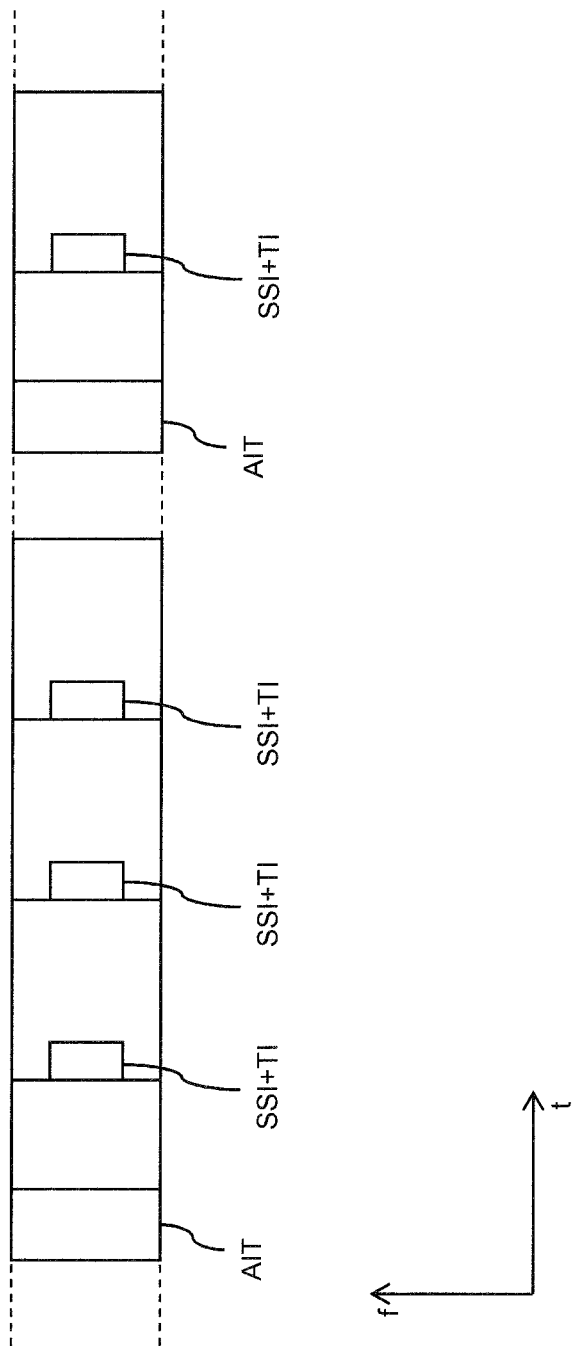
FIG. 3 schematically illustrates transmission of AITs and identifiers, and timing information according to an embodiment of the invention.

FIG. 3 shows an example of how transmission of the AIT, the SSI, and the timing information (TI) for a given carrier frequency may be organized in the time (t) and frequency (f) domain. As illustrated, the SSIs are transmitted more frequently than the AIT. For example, a relatively long period, e.g., from 1.024 s up to 10.24 s, may be utilized for transmission of the AIT, while a shorter period, e.g., of about 100 ms, may be utilized for transmission of the SSI. It should be noted that both periods may be longer than a granularity of resource allocation in the time domain, which may for example be based on time slots in the order of 1 ms or less.

Each SSI may for example define a 10 bit data value, which allows for distinguishing between 1024 different SSIs. The received SSI is utilized by the UE 10 to identify an applicable entry of the received AIT, which defines a configuration to be used by the UE 10 when accessing the cellular network.

As an illustrative example, it can be assumed that the AIT transmission period is 64 times the transmission period of the timing information (and of the SSI). Representing the timing information by indicating the remaining time until the next AIT transmission in terms of a countdown (CD) value with a granularity of the SSI transmission period may then require 6 bits.

In view of energy efficiency and/or resource efficiency, it may be beneficial to even further reduce the above-mentioned 6 bits to a smaller number. This may be achieved by defining a set of scrambling sequences which may be used to encode the timing information and letting the choice of the scrambling sequence from this set represent some of the bits. For instance, 16 different scrambling sequences could be used to respectively represent one of the 16 possible combinations of 4 bits of the timing information. Using this principle, only two bits would actually have to be modulated onto the carrier frequency, because the remaining 4 bits would be represented by the scrambling sequence used for the transmission. Using other numbers of scrambling sequences in the set, e.g., 8 or 32, would of course be possible as well. It is noted that this reduction in the number of modulated bits can have the effect that the UE needs to perform multiple attempts of decoding the timing information until the correct scrambling sequence is found.

In some scenarios, the timing information may also be represented by defining a set of different scrambling sequences for transmission of the SSI. In the above-mentioned example with 64 SSI periods per AIT period, 64 different scrambling sequences could be used for scrambling the SSI, depending on the number of SSI periods that remain until the next AIT transmission. In this way, a countdown indicator indicating the remaining time until the next transmission of the AIT could be represented entirely by the choice of scrambling sequence, and no dedicated information bits would need to be modulated onto the carrier signal. Combinations of using different scrambling sequences for the SSI transmission and dedicated bits (with or without selective scrambling) may also be used for representing the timing information.

In the above examples, the set of scrambling sequences may be preconfigured in the UE and the access nodes, e.g., based on standardization requirements or operator-specific preconfigurations. In some cases, the list of scrambling sequences could also be defined based on information indicated in the AIT. For example, the AIT could define a set of scrambling sequences which applies to multiple or even all SSIs covered by the AIT. Further, the AIT could define individualized sets of scrambling sequences per SSI. A generic set of scrambling sequences, e.g. standardized or preconfigured, could define a maximum set of scrambling sequences that could be utilized, e.g., to support transmission of the timing information with maximum granularity in a scenario with a maximum number of transmission periods of the timing information fitted in an AIT transmission period. In cases where the number of timing information transmission periods per AIT transmission period is smaller than this maximum number or a lower granularity of the timing information is utilized, a subset of the set of maximum set may be utilized, e.g., as obtained by truncating the set of sequences. This subset may e.g. be indicated in the AIT. Alternatively, the subset need not be indicated, but the UE knows (e.g. from standard compliant preconfiguration or operator-specific preconfiguration) in which order to try the scrambling sequences in the set, so that the unused scrambling sequences (i.e. the ones truncated from the set) are tried last (which means that in a typical case they will not be tried at all, since the UE will already have found a scrambling sequence that enabled correct decoding/reception).

Other ways of compressing the timing information may be utilized as an alternative or in addition. For example, such compression techniques may be based on the assumption that the UE 10 can receive multiple transmissions of the timing information while waiting for the AIT transmission.

According to one option, the complete timing information is not sent on every SSI transmission occasion, but only on every N-th SSI transmission occasion. Statistically, the UE 10 thus on average needs to monitor N/2 SSI transmission opportunities for receiving the timing information. The timing information is in this case transmitted less frequently, with the effect of fewer bits being sent in total, thereby saving energy and avoiding interference.

According to a further option, the timing information may be transmitted with less accuracy. This may be compensated by the UE 10 monitoring the carrier frequency for a longer time period at the indicated time of the AIT transmission (i.e. with greater margin), e.g., over two or more SSI transmission periods.

According to a further option, the timing information may be distributed over a sequence of multiple transmissions. For example, in some cases the timing information may include a CD value representing a remaining time until a next transmission of the timing information. This next transmission of the timing information may contain another CD representing the remaining time until a further next transmission of timing information. This sequence may continue until a transmission includes a CD value indicating the remaining time until the next transmission of the AIT. In this way the maximum CD value indicated in each transmission can be lowered and be represented by fewer bits. On the other hand, the UE 10 may need to receive the timing information in multiple transmissions.

According to a further option, the timing information may be distributed over a sequence of multiple transmissions in a different way. With this option the timing information may include a CD value representing a remaining time until the next transmission of timing information that represents the remaining time until the next transmission of the AIT. For example, a sequence of such transmissions may consist of 4 transmissions of CDs of the former type followed by one transmission of timing information, e.g. in the form of a CD, representing the remaining time until the next transmission of the AIT and this sequence of 5 CDs may be repeated until the transmission of the AIT. Each of the four first CDs in such a sequence would thus contain a value indicating the time from its own transmission until the transmission of the fifth CD in the sequence and this fifth CD would indicate the remaining time until the transmission of the AIT.

According to an example, the timing information can indicate the CD value as one of four different values: 1, 2, 4, 8, corresponding to units of SSI transmission periods. These values may be represented by two bits. If the remaining time until the next transmission of the AIT is longer than 8 SSI transmission periods, a CD value of 8 is transmitted. When 8 SSI transmission periods have expired, the UE 10 monitors the carrier frequency again to receive a further CD value, which may then correspond to the remaining time until the next transmission of the AIT. In the latter example no CD value was defined for remaining times of 3, 5, 6, and 7 SSI transmission periods. These CD values could be supported by defining a multi-step transmission procedure, where the UE 10 reads a first CD value (CD1) and then, when the time corresponding to the first CD value has expired, reads a second CD value (CD2), and when the time corresponding to the second CD value has expired optionally reads a third CD value (CD3). These different CD values may then sum up to yield a total CD value of 3, 5, 6, or 7. For example, a total CD value of 3 could be represented by CD1=4 and CD2=1, a total CD value of 5 could be represented by CD1=4 and CD2=1, a total CD value of 6 could be represented by CD1=4 and CD2=1, and a total CD value of 7 could be represented by CD1=4, CD2=1, and CD3=1. Other ways of combining individual CD values to a total CD value could be utilized as well, e.g., by transmitting CD values to be combined as a back-to-back sequence.

Further, the CD values which can be represented by the timing information can be defined in various ways. According to one example, only two different values of, e.g., 16 and 1 could be defined, represented by one bit. In this case, if the total CD value to be indicated is higher than 16, a CD value of 16 would be transmitted, otherwise a CD value of 1. If the remaining time until the next AIT transmission corresponds to less than the CD value of 16, the UE 10 would monitor all SSI transmission occasions (or other possible AIT transmission occasions in case the AIT is not transmitted in conjunction with a SSI) until the AIT is eventually received.

Other sets of possible CD values could for example be defined based on an exponential rule to include values of $2^n$ or $10^n$, with n=0, 1, 2, ..., or based on the Fibonacci series to include values of 1, 2, 3, 5, 8, 13, 21, .... The latter option may allow for defining a desired total CD value by combining slightly less individual CD values than in the case of defining the values based on an exponential rule.

In addition or as an alternative to using a scrambling sequence for encoding the timing information, also the SSI itself could be utilized for encoding the timing information. For this purpose, groups of SSIs, e.g., each corresponding to a continuous range, may be defined. Such definitions may be preconfigured in the access nodes 111, 112, 113, 114, 115, and the UEs 10, e.g., based on standardization requirements. The SSI being part of a certain group may then identify the applicable entry of the AIT, wherein different SSIs within the same group encode the timing information. For example, one group of SSIs could include the SSIs in the range [X, X+1, ..., X+N], i.e., a set of SSIs satisfying the relation SSI=X+δ where 0≤δ≤N. The value of δ could then represent or indicate the CD value. Accordingly, when the UE 10 detects the SSI, it identifies to which group or range it belongs, derives the value of δ and the corresponding CD value (which may be δ itself or may be derived from δ according to some rule, e.g., as $2^δ$. The CD value could also be part entry of the AIT identified by the SSI. In this case, the AIT could include N+1 AIT entries containing with the same access parameters but a different CD value. In other words, all the SSIs in such a group may correspond to the same access information in the AIT, either by including multiple copies of the same access information, i.e. in multiple AIT entries, or by indicating the entire group of SSIs as associated with a single AIT entry containing the concerned access information.

In some scenarios, the AIT may also include an indication of the AIT transmission period. The AIT transmission period could be encoded at the beginning of the AIT, e.g., in a common part which could be denoted "AIT header". In some cases, this part of the AIT could be encoded with a more robust coding scheme than other parts of the AIT.

In some cases, the AIT transmission period could also be included in the individual entries of the AIT. For example, one AIT transmission period could be associated with each SSI identifying an entry in the AIT. This would facilitate configuration of different AIT transmission periods for different SSIs. However, it would also be feasible to use different AIT transmission periods even if the AIT transmission period is included in a common part of the AIT, e.g., by configuring this AIT transmission period indication to match the SSI that is used at the considered location. This would corresponds to a local SSI dependent adaptation of the AIT.

As a further option, the indication of the AIT transmission period could be transmitted outside the AIT, e.g., as a separate parameter. Such separate parameter could be transmitted in conjunction with the AIT, e.g., by a common transmission, or even separately from the AIT.

As an example, the AIT transmission period could be indicated through choice of a scrambling sequence used for scrambling the AIT or a part of the AIT (e.g., a header part). A set of scrambling sequences to choose from could be preconfigured in the UE and the access nodes, e.g., based on standardization requirements or operator-specific pre-configurations. Each scrambling sequence of the set may then indicate a corresponding AIT transmission period, which again may be preconfigured in the UE and the access nodes, e.g., based on standardization requirements or operator-specific pre-configurations.

Figure 4:
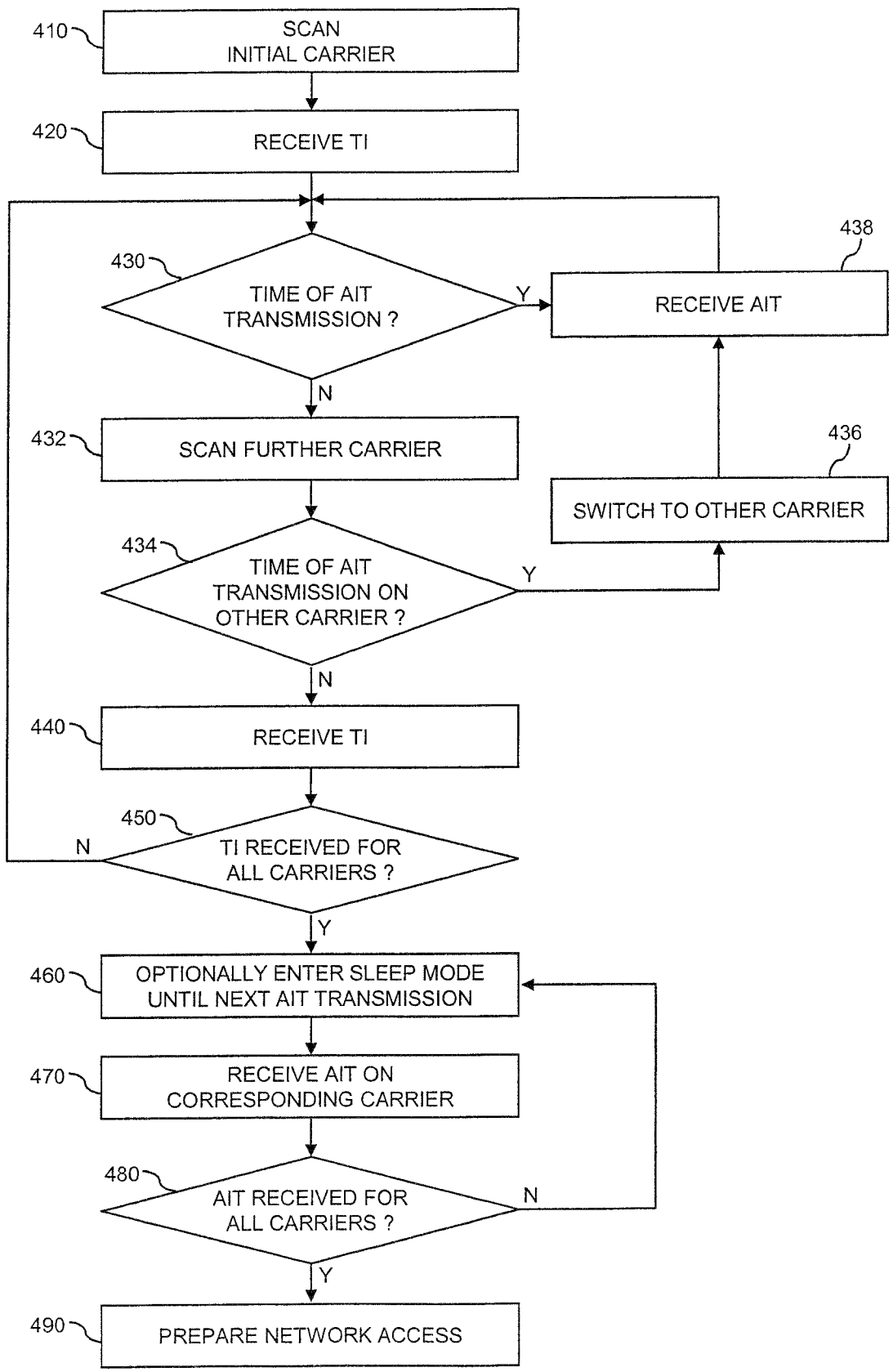
FIG. 4 shows exemplary procedures for illustrating how a UE may utilize the timing information according to an embodiment of the invention.

FIG. 4 shows a flow chart schematically illustrating procedures which may be performed by the UE 10 when utilizing the timing information to improve efficiency of scanning multiple carrier frequencies for AIT transmissions. In the procedures of FIG. 4, it is assumed that the UE 10 is about to scan a number of carrier frequencies (and possibly different RATs) in order to receive one or more AITs.

After receiving the timing information on the first scanned carrier frequency, the UE 10 has information about the time when the AIT will be transmitted on this carrier frequency, or at least has information on time intervals when the AIT will not be transmitted. In these time intervals, the UE 10 can scan a second carrier frequency or enter a sleep mode. Also on the second carrier frequency, the UE 10 can receive the timing information and thus gather information about when the AIT will be transmitted on this carrier frequency and determine time intervals when the AIT will not be transmitted. In this way the UE 10 can collect the timing information of multiple carrier frequencies while waiting for the AIT to be transmitted on the carrier frequencies where the timing information has been received and the potential times of the expected AIT transmission are thus known. The UE 10 may revisit each carrier frequency at the time of its respective AIT transmission and use the rest of the time to scan other carrier frequencies. This may continue until the timing information has been received on all carrier frequencies to be scanned. The UE 10 may then enter a sleep mode and wake up at the time of an expected AIT transmission until AITs have been received on all carrier frequencies to be scanned.

At step 410, the UE 10 starts scanning on an initial carrier frequency (in the figure simply denoted as "carrier"). The initial carrier frequency may for example be preconfigured in the UE 10 or may correspond to a last utilized carrier frequency, e.g., a carrier frequency utilized before powering down the UE 10 or otherwise disconnecting the UE 10 from the cellular network.

At step 420, the UE 10 receives the timing information on the initial carrier frequency. As mentioned above, the timing information indicates the time of a next transmission of the AIT on the initial carrier frequency. The timing information may for example indicate the remaining time until the next transmission of the AIT, e.g., in terms of one or more CD values as explained above.

At step 430, the UE 10 utilizes the received timing information to determine whether the time of an AIT transmission on the currently considered carrier frequency is reached (or will be reached in such a short period of time that it is not beneficial for the UE to attempt to scan another carrier frequency in the meantime). If this is not the case, i.e., if presently no AIT transmission is expected on the considered carrier frequency, the UE 10 proceeds to step 432 to scan a further carrier frequency, as indicated by branch "N".

While scanning the further carrier frequency, the UE 10 checks whether the timing information received so far, e.g., on one or more already scanned carrier frequencies, indicates that the time of an AIT transmission on another carrier frequency is reached. If this is the case, the UE 10 proceeds to step 436 to switch to this other carrier frequency. Then, the UE 10 proceeds to step 438 to receive the AIT at the indicated time. From step 438, the UE 10 returns to step 430.

If the check of step 430 reveals that the time of an AIT transmission on the currently considered carrier frequency is reached, the UE 10 proceeds directly to step 438 to receive the AIT on the currently considered carrier frequency.

If the check of step 434 reveals that presently no AIT transmission is expected on another carrier frequency, the UE 10 proceeds to step 440 to receive the timing information on the currently scanned further carrier frequency, as indicated by branch "N".

Having received the timing information at step 440, the UE 10 proceeds to step 450 to check whether the timing information was received for all carrier frequencies to be scanned. If this is not the case, the UE 10 returns to step 430, as indicated by branch "N". If the timing information was received for all carrier frequencies to be scanned, the UE 10 proceeds to step 460, as indicated by branch "Y".

At step 460, the UE 10 may optionally enter a sleep mode until the next AIT transmission is expected according to the received timing information. In the sleep mode, for example receiver functionalities of the UE 10 may be switched off in order to save energy.

At step 470, the UE 10 receives the AIT at the time expected according to the received timing information for the respective carrier. For this purpose, the UE 10 will wake up from the sleep mode entered at step 460.

At step 480, the UE 10 then checks whether an AIT was received for all carrier frequencies to be scanned. If this is not the case, the UE 10 returns to step 460 to receive the AIT on one or more further carrier frequencies, as indicated by branch "N". If the check of step 480 reveals that the AIT was received for all carrier frequencies to be scanned, the UE 10 proceeds to step 490 to prepare accessing the cellular network based on access information selected from one or more of the received AITs, as indicated by branch "Y".

It should be noted that in the procedures of FIG. 4 the UE 10 may also receive the AIT before the timing information on a given carrier. In such situation, further consideration of the timing information is not required for this carrier frequency, and the UE 10 may focus on scanning other carrier frequencies for transmissions of the timing information and AIT.

In an alternative scenario, the UE 10 may aim at maximizing its sleep time by scanning one, i.e. a first, carrier frequency and utilizing the timing information to enter the sleep mode until the time of the next AIT transmission on that first carrier frequency. In some cases, the UE 10 may receive a first AIT on a first carrier frequency, and this first AIT may indicate timing information of AIT transmissions on other carrier frequencies. The UE 10 may then again enter the sleep mode and wake up at the time of an expected AIT transmission on any of the other carrier frequencies until AITs have been received on all carrier frequencies to be scanned.

Figure 5:
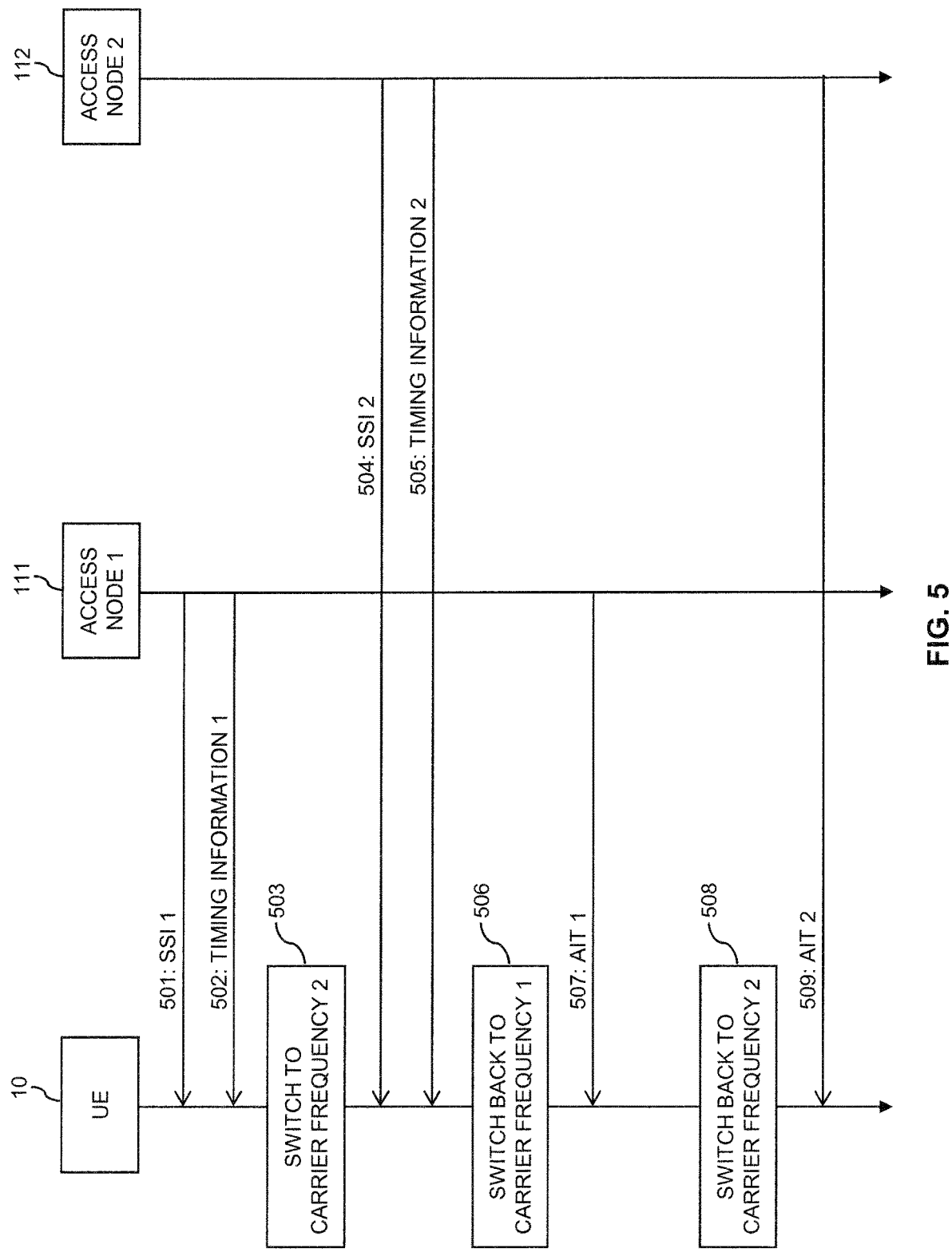
FIG. 5 shows an example of processes according to an embodiment of the invention.

FIG. 5 shows exemplary processes which are based on the above concepts. The processes of FIG. 5 involve one of the UEs 10, the access node 111, and the access node 112. In the processes of FIG. 5, it is assumed that the access node 111 transmits on the first carrier frequency (carrier frequency 1) while the access node 112 transmits on the second carrier frequency (carrier frequency 2) which is different from the first carrier frequency. The processes of FIG. 5 may be performed in the course of the UE 10 scanning multiple carrier frequencies for AIT transmissions. It is noted that the UE 10 may have scanned other carrier frequencies before the processes of FIG. 5, and may also scan further carrier frequencies after the processes of FIG. 5.

In the processes of FIG. 5, the access node 111 first transmits a first SSI 501 and first timing information 502. As explained above, the first SSI 501 and the first timing information 502 may be transmitted in conjunction, e.g., in a single broadcast transmission.

The UE 10 receives the first SSI 501 and the first timing information 502. The first timing information 502 indicates the time of a next transmission of a first AIT on the first carrier frequency, e.g., in the form of a CD value representing the remaining time until the next transmission of the first AIT. In the example of FIG. 5, it is assumed that the transmission of the first AIT is performed by the access node 111. However, in some scenarios the transmission of the first AIT could also be performed by some other access node transmitting on the first carrier frequency. The first SSI 501 enables the UE 10 to select applicable access information from the first AIT.

Depending on the received first timing information 502, the UE 10 then decides whether to switch to the second carrier frequency, as illustrated by step 503. Here, the UE 10 may for example consider whether there is sufficient time to scan the second carrier frequency before the next transmission of the first AIT on the first carrier frequency. For example, if the remaining time until the next transmission of the first AIT is above a threshold, e.g., corresponding to one period as minimally configurable for repeated transmission of the timing information, the UE 10 may decide to switch to the second carrier frequency. In the example of FIG. 5, it is assumed that the UE 10 decides to switch to the second carrier frequency because there is sufficient remaining time until the next transmission of the first AIT.

As further illustrated, the access node 112 then transmits a second SSI 504 and second timing information 505. As explained above, the second timing information 505 and the second SSI 505 may be transmitted in conjunction, e.g., in a single broadcast transmission.

The UE 10 receives the second SSI 504 and the second timing information 505. The second timing information 505 indicates the time of a next transmission of a second AIT on the second carrier frequency, e.g., in the form of a CD value representing the remaining time until the next transmission of the second AIT. In the example of FIG. 5, it is assumed that the transmission of the second AIT is performed by the access node 112. However, in some scenarios the transmission of the second AIT could also be performed by some other access node transmitting on the second carrier frequency. The second SSI 504 enables the UE 10 to select applicable access information from the second AIT. The first AIT and the second AIT may have the same or similar content, or may differ from each other at least with respect to some entries. The first SSI 501 and the second SSI 504 may be the same or different from each other.

Depending on the received second timing information and the received first timing information, the UE 10 then decides whether to switch to another carrier frequency, as illustrated by step 506. This decision also includes whether to switch back to the first carrier frequency. Here, the UE 10 may for example consider whether there is sufficient time to scan the another carrier frequency before the next transmission of the second AIT on the second carrier frequency. Further, the UE 10 may consider whether the received first timing information indicates that the next transmission of the first AIT on the first carrier frequency occurs before the next transmission of the second AIT on the second carrier frequency. In the example of FIG. 5, it is assumed that the first timing information and the second timing information indicate that the next transmission of the first AIT occurs before the next transmission of the second AIT and the UE 10 thus decides to switch back to the first carrier frequency to receive the first AIT at the indicated time, as illustrated by step 506 and AIT transmission 507.

Depending on the received second timing information, the UE 10 then decides when to switch back to the second carrier frequency to receive the second AIT, as illustrated by step 508 and AIT transmission 509. While waiting for the transmission of the second AIT, the UE 10 may enter the sleep mode to save energy. However, it is also possible that the UE 10 uses the remaining time until the next transmission of the second AIT to scan other carrier frequencies.

Figure 6:
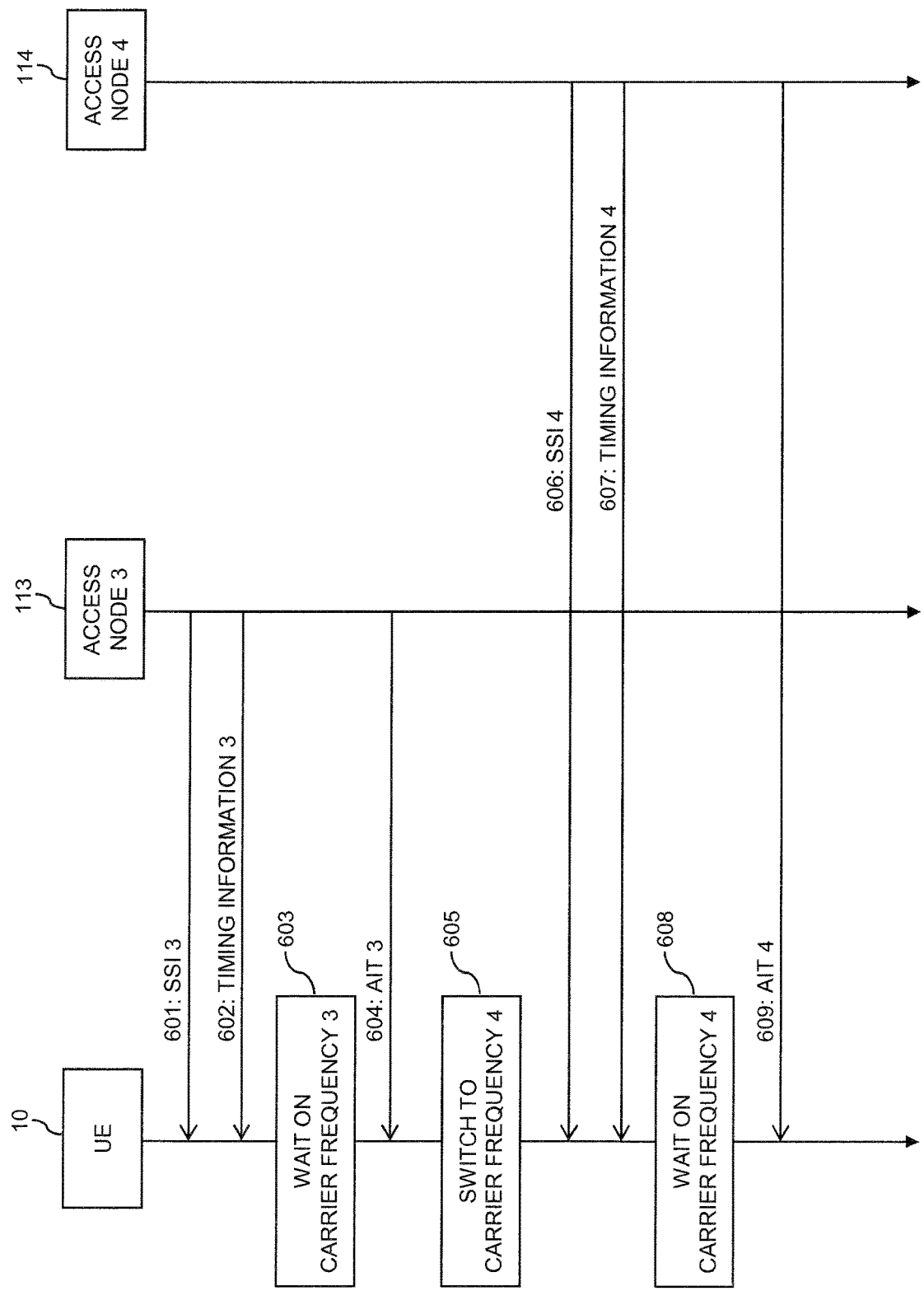
FIG. 6 shows a further example of processes according to an embodiment of the invention.

FIG. 6 shows further exemplary processes which are based on the above concepts. The processes of FIG. 6 involve one of the UEs 10, the access node 113, and the access node 114. In the processes of FIG. 6, it is assumed that the access node 113 transmits on the third carrier frequency (carrier frequency 3) while the access node 112 transmits on the fourth carrier frequency (carrier frequency 4) which is different from the third carrier frequency. The processes of FIG. 6 may be performed in the course of the UE 10 scanning multiple carrier frequencies for AIT transmissions. It is noted that the UE 10 may have scanned other carrier frequencies before the processes of FIG. 6, and may also scan further carrier frequencies after the processes of FIG. 6. For example, the processes of FIG. 6 may be performed before or after the processes of FIG. 5.

In the processes of FIG. 6, the access node 113 first transmits a third SSI 601 and third timing information 602. As explained above, the third SSI 601 and the third timing information 602 may be transmitted in conjunction, e.g., in a single broadcast transmission.

The UE 10 receives the third SSI 601 and the third timing information 602. The third timing information 602 indicates the time of a next transmission of a third AIT on the third carrier frequency, e.g., in the form of a CD value representing the remaining time until the next transmission of the third AIT. In the example of FIG. 6, it is assumed that the transmission of the third AIT is performed by the access node 113. However, in some scenarios the transmission of the third AIT could also be performed by some other access node transmitting on the third carrier frequency. The third SSI 601 enables the UE 10 to select applicable access information from the third AIT.

Depending on the received third timing information 602, the UE 10 then decides whether to switch to the fourth carrier frequency, as illustrated by step 603. Here, the UE 10 may for example consider whether there is sufficient time to scan the fourth carrier frequency before the next transmission of the third AIT on the third carrier frequency. For example, if the remaining time until the next transmission of the third AIT does not exceed a threshold, e.g., corresponding to one period as minimally configurable for repeated transmission of the timing information, the UE 10 may decide not to switch to the fourth carrier frequency. In the example of FIG. 6, it is assumed that the UE 10 decides to wait on the third carrier frequency, i.e., not to switch to the fourth carrier frequency or some other carrier frequency, until receiving the third AIT at the indicated time, as illustrated by AIT transmission 604. While waiting for the transmission of the third AIT, the UE 10 may enter the sleep mode to save energy. Having received the third AIT, the UE 10 then switches to the fourth carrier frequency, as illustrated by step 605.

As further illustrated, the access node 114 then transmits a fourth SSI 606 and fourth timing information 607. As explained above, the fourth SSI 606 the fourth timing information 607 may be transmitted in conjunction, e.g., in a single broadcast transmission.

Depending on the received fourth timing information 607, the UE 10 then decides whether to switch to another carrier frequency, as illustrated by step 608. Here, the UE 10 may for example consider whether there is sufficient time to scan another carrier frequency before the next transmission of the fourth AIT on the fourth carrier frequency. For example, if the remaining time until the next transmission of the fourth AIT does not exceed a threshold, e.g., corresponding to one period as minimally configurable for repeated transmission of the timing information, the UE 10 may decide not to switch to another carrier frequency. In the example of FIG. 6, it is assumed that the UE 10 decides to wait on the fourth carrier frequency, i.e., not to switch another carrier frequency, until receiving the fourth AIT at the indicated time, as illustrated by AIT transmission 609. While waiting for the transmission of the fourth AIT, the UE 10 may enter the sleep mode to save energy.

Figure 7:
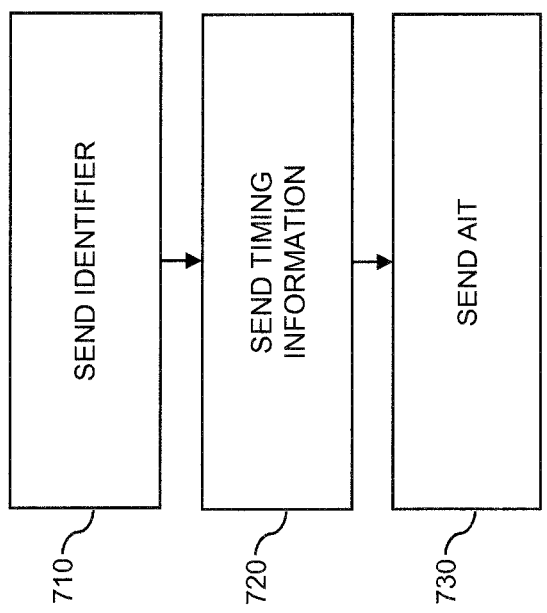
FIG. 7 shows a flowchart for schematically illustrating a method according to an embodiment of the invention.

FIG. 7 shows a flowchart for illustrating a method of controlling access to a cellular network. The method of FIG. 7 may be utilized for implementing the illustrated concepts in an access node of the cellular network. The access node may correspond to one of the above-mentioned access nodes 111, 112, 113, 115. If a processor-based implementation of the access node is used, the steps of the method may be performed by one or more processors of the access node. In such a case the access node may further comprise a memory in which program code for implementing the below described functionalities is stored. The method may be used for controlling access of a radio device to the cellular network. The radio device may correspond to a UE, such as one of the UEs 10. However, the method may also be applied with respect to other kinds of radio devices, such as relay nodes or devices having only modem functionality.

At step 710, the access node transmits an identifier. This may be accomplished on a given carrier frequency assigned to the access node. The identifier enables selection of access information from an AIT. The access information is applicable by radio devices, such as the above-mentioned UEs, for accessing the cellular network. The access information may include various kinds of system information. For example, the access information may include parameters defining a configuration for performing a random access procedure, parameters defining a configuration for performing a paging procedure, parameters defining a beam-forming configuration, parameters defining a link adaptation configuration, and/or parameters defining a HARQ configuration. The above-mentioned SSI is an example of such identifier. In some scenarios, the AIT may also include information on a period applied for repeated transmission of the AIT or other AITs.

At step 720, the access node transmits timing information indicating a time of a next transmission of the AIT. Also the transmission of the timing information may be accomplished on a given carrier frequency assigned to the access node. The access node may transmit the timing information in conjunction with the identifier, e.g., in the same transmission. The access node may transmit the timing information repeatedly. If the AIT is repeatedly transmitted with a first period, the access node may transmit the timing information with a second period which is shorter than the first period. In this respect, it is noted that the repeated transmission of the AIT is intended to also include scenarios where the AIT is updated or otherwise modified from one repetition cycle to the next.

The timing information may indicate a remaining time until a next transmission of the access information table, e.g., in the form of the above-mentioned CD value. The timing information may at least in part be encoded by selection of a scrambling sequence from a set of scrambling sequences. However, other ways of encoding the timing information may be utilized in addition or as an alternative. For example, at least a part of the timing information could also be encoded by selection of the identifier from a group of identifiers, such as in the above-mentioned example of encoding the timing information by choice of an SSI from a group of SSIs. Further, the timing information may also be compressed, e.g., by utilizing a reduced time granularity and/or by distributing the timing information over multiple transmissions.

At optional step 730, the access node may transmit the AIT. However, it is to be understood that in some scenarios the AIT may also be transmitted by other access nodes. For example, the access node could correspond to an access node serving a small cell, such as one of the above-mentioned access nodes 115, and the AIT could be transmitted by another access node which serves a macro cell overlapping this small cell. The AIT transmitted at step 730 may be determined by the access node, e.g., to include the above-mentioned access information. However, it is noted that in some scenarios at least a part of the AIT may also be determined by another node, e.g., by a management or control node responsible for management and control of multiple access nodes of the cellular network.

Figure 8:
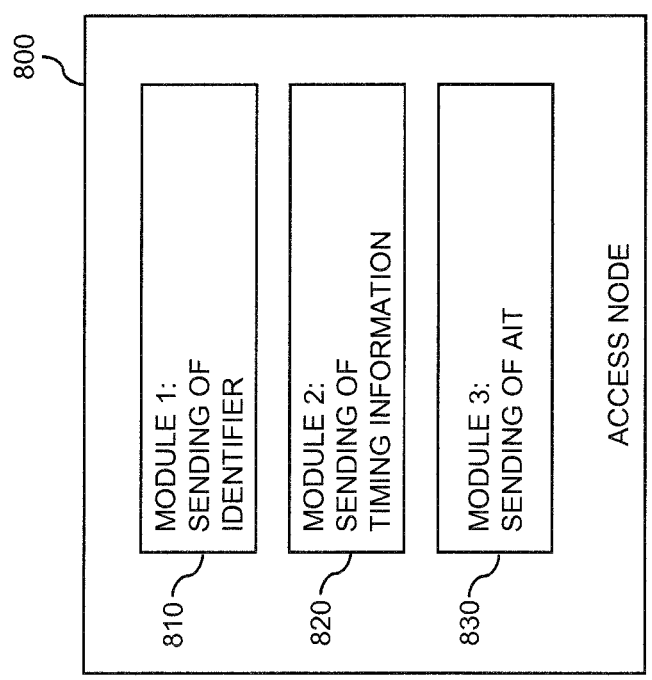
FIG. 8 shows a block diagram for illustrating functionalities of an access node according to an embodiment of the invention.

FIG. 8 shows a block diagram for illustrating functionalities of an access node 800 which operates according to the method of FIG. 7. As illustrated, the access node 800 may be provided with a module 810 configured to send an identifier enabling selection of access information from an AIT, such as explained in connection with step 710. Further, the access node 800 may be provided with a module 820 configured to send timing information indicating a time of a next transmission of the AIT, such as explained in connection with step 720. Further, the access node 800 may optionally be provided with a module 830 configured to send the AIT, such as explained in connection with step 830.

It should be understood that the access node 800 may also include further modules for implementing other functionalities, such as functionalities for controlling connections to radio devices or transfer of data on such connections, and that the modules of the access node 800 do not necessarily represent a hardware structure of the access node 800, but may also correspond to functional elements, e.g., implemented by hardware, software, or a combination thereof.

Figure 9:
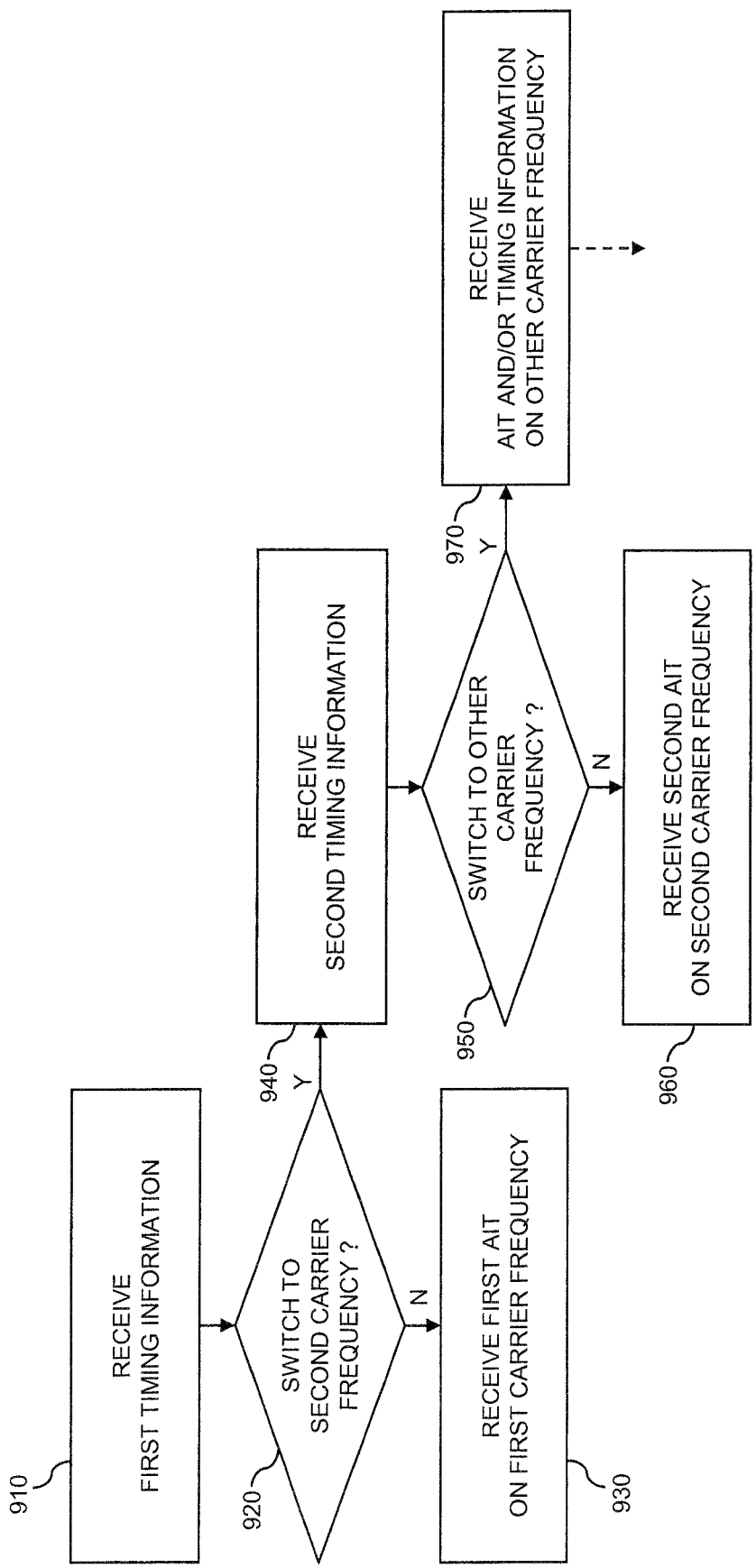
FIG. 9 shows a flowchart for schematically illustrating a further method according to an embodiment of the invention.

FIG. 9 shows a flowchart for illustrating a method of controlling access to a cellular network. The method of FIG. 9 may be utilized for implementing the illustrated concepts in a radio device. The radio device may correspond to a UE, such as one of the UEs 10. However, the radio device could also correspond to another kind of radio devices, such as a relay node or a device having only modem functionality. If a processor-based implementation of the radio device is used, the steps of the method may be performed by one or more processors of the radio device. In such a case the radio device may further comprise a memory in which program code for implementing the below described functionalities is stored.

At step 910, the radio device receives first timing information on a first carrier frequency. The first timing information indicates a time of a next transmission of a first AIT on the first carrier frequency. The first AIT includes first access information to be applied by radio devices for accessing the cellular network. The first access information may include various kinds of system information. For example, the first access information may include parameters defining a configuration for performing a random access procedure, parameters defining a configuration for performing a paging procedure, parameters defining a beam-forming configuration, parameters defining a link adaptation configuration, and/or parameters defining a HARQ configuration. In some scenarios, the first AIT may also include information on a period applied for repeated transmission of the AIT or other AITs.

The first AIT may be repeatedly transmitted with a first period, and the first timing information may then be repeatedly transmitted with a second period which is shorter than the first period. The radio device may receive the first timing information in conjunction with a first identifier enabling selection of the first access information from the first AIT. For example, the radio device may receive the first timing information and the first identifier in the same transmission.

The first timing information may indicate a remaining time until a next transmission of the first AIT, e.g., in the form of the above-mentioned CD value. The first timing information may at least in part be encoded by selection of a scrambling sequence from a set of scrambling sequences. In this case, receiving of the first timing information may involve attempting decoding based on one scrambling sequence after the other from the set until decoding is successful. However, other ways of encoding the first timing information may be utilized in addition or as an alternative. For example, at least a part of the timing information could also be encoded by selection of the above-mentioned first identifier from a group of identifiers, such as in the above-mentioned example of encoding the timing information by choice of an SSI from a group of SSIs. Further, the first timing information may also be compressed, e.g., by utilizing a reduced time granularity and/or by distributing the first timing information over multiple transmissions.

At step 920, the radio device performs a selection depending on the received first timing information. Specifically, the radio device selects between, on the one hand, waiting on the first carrier frequency until the time of the next transmission of the first AIT to receive the first AIT on the first carrier frequency and, on the other hand, switching to a second carrier frequency.

If the radio device decides not to switch to the second carrier frequency, as indicated by branch "N", the radio device will wait on the first carrier frequency until receiving the first AIT on the first carrier frequency, as indicated by step 930. While waiting, the radio device may enter a sleep mode. In the sleep mode, certain functionalities of the radio device, e.g., radio functionalities, may be switched off to save energy.

If the radio device decides to switch to the second carrier frequency, as indicated by branch "Y", the radio device may scan the second carrier frequency for transmissions.

In particular, at step 940 the radio device may receive second timing information on the second carrier frequency. The second timing information indicates a time of a next transmission of a second AIT on the second carrier frequency. The second AIT includes second access information to be applied by radio devices for accessing the cellular network. The second access information may include various kinds of system information. For example, the second access information may include parameters defining a configuration for performing a random access procedure, parameters defining a configuration for performing a paging procedure, parameters defining a beam-forming configuration, parameters defining a link adaptation configuration, and/or parameters defining a HARQ configuration. In some scenarios, the second AIT may also include information on a period applied for repeated transmission of the second AIT or other AITs.

The second AIT may be repeatedly transmitted with a third period, and the second timing information may then be repeatedly transmitted with a fourth period which is shorter than the third period. The third period may be the same as or different from the above-mentioned first period applied for repeatedly transmitting the first AIT. The fourth period may be the same as or different from the above-mentioned second period applied for repeatedly transmitting the first timing information. The radio device may receive the second timing information in conjunction with a second identifier enabling selection of the second access information from the second AIT. For example, the radio device may receive the second timing information and the second identifier in the same transmission.

The second timing information may indicate a remaining time until a next transmission of the first AIT, e.g., in the form of the above-mentioned CD value. The second timing information may at least in part be encoded by selection of a scrambling sequence from a set of scrambling sequences. However, other ways of encoding the first timing information may be utilized in addition or as an alternative. In this case, receiving of the second timing information may involve attempting decoding based on one scrambling sequence after the other from the set until decoding is successful. For example, at least a part of the second timing information could also be encoded by selection of the above-mentioned second identifier from a group of identifiers, such as in the above-mentioned example of encoding the timing information by choice of an SSI from a group of SSIs. Further, the second timing information may also be compressed, e.g., by utilizing a reduced time granularity and/or by distributing the second timing information over multiple transmissions.

At step 950, the radio device may perform a selection depending on the received second timing information and the received first timing information. Specifically, the radio device may select between, on the one hand, waiting on the second carrier frequency until the time of the next transmission of the second AIT to receive the second AIT on the second carrier frequency and, on the other hand, switching to another carrier frequency. This other carrier frequency may correspond to the first carrier frequency. Specifically, one option in the selection of step 950 may correspond to selecting to switch back to the first carrier frequency to receive the first AIT at the time of the next transmission of the first AIT, as indicated by the first timing information. Further, one option in the selection of step 950 may correspond to selecting to switch to a third carrier frequency.

If the radio device decides not to switch to another carrier frequency, as indicated by branch "N", the radio device will wait on the second carrier frequency until receiving the second AIT on the second carrier frequency, as indicated by step 960. While waiting, the radio device may enter a sleep mode. In the sleep mode, certain functionalities of the radio device, e.g., radio functionalities, may be switched off to save energy.

If the radio device decides to switch to another carrier frequency, as indicated by branch "Y", the radio device may receive an AIT and/or timing information on this other carrier frequency, as indicated by step 970. For example, if the radio device switches back to the first carrier frequency, the radio device may receive the first AIT at the time of the next transmission indicated by the first timing information. Further, if the radio device switches to a third carrier frequency, the radio device may receive third timing information and/or a third AIT on the third carrier frequency. This may involve performing steps which correspond to steps 940, 950, 960, and 970.

It is noted that the method of FIG. 9 may be extended to cover an arbitrary number of carrier frequencies with transmission of a corresponding AIT and corresponding timing information on each carrier frequency. Typically, all the timing information received so far may be considered by the radio device in the decisions whether to switch to another carrier frequency. For example, if the timing information was received for a certain carrier frequency, the radio device may decide to switch back to this carrier frequency at the indicated time of the transmission of the AIT on this carrier frequency. However, in some cases already received timing information could also be disregarded in the decision. For example, if the AIT was already received on a certain carrier frequency, the radio device may disregard the corresponding timing information.

It is also noted that in some cases the timing information may also include information on a period applied for repeated transmission of the corresponding AIT. This information may for example be used by the radio device when deciding to omit receiving the AIT on the next transmission occasion, e.g., because AIT transmissions on two or more carrier frequencies occur simultaneously. The radio device may then utilize the information on the period to determine the time of a later transmission of the AIT.

Figure 10:
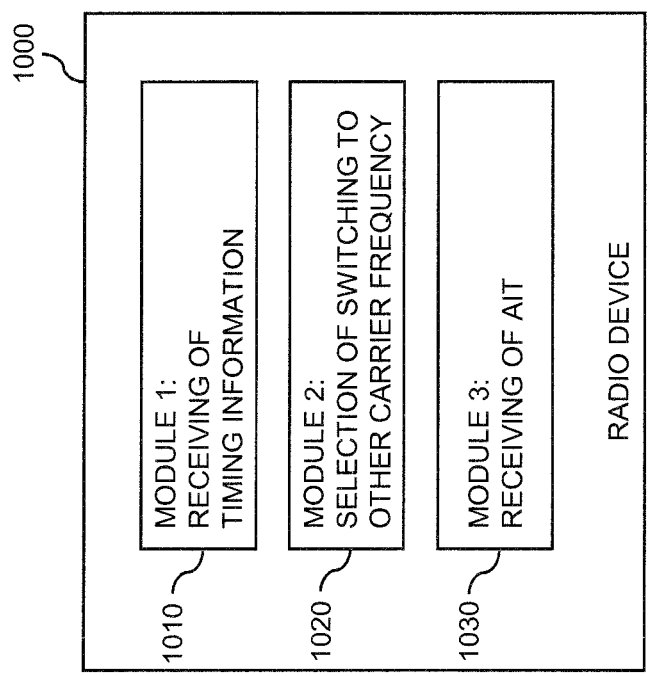
FIG. 10 shows a block diagram for illustrating functionalities of a radio device according to an embodiment of the invention.

FIG. 10 shows a block diagram for illustrating functionalities of a radio device 1000 which operates according to the method of FIG. 9. As illustrated, the radio device 1000 may be provided with a module 1010 configured to receive timing information indicating a time of a next transmission of an AIT on a given carrier frequency, e.g., on a first carrier frequency, such as explained in connection with step 910, or on a second carrier frequency, such as explained in connection with step 940. Further, the radio device 1000 may be provided with a module 1020 configured to control, depending on the receive timing information, switching to another carrier frequency, e.g., to a second carrier frequency, such as explained in connection with step 920, or to a third carrier frequency or back to the first carrier frequency, such as explained in connection with step 950. Further, the radio device 1000 may be provided with a module 1030 configured to receive one or more AITs, e.g., the first AIT, such as explained in connection with step 930, or the second AIT, such as explained in connection with step 960.

It should be understood that the radio device 1000 may also include further modules for implementing other functionalities, such as functionalities for establishing a connection to the cellular network or controlling transfer of data on such connection, and that the modules of the radio device 1000 do not necessarily represent a hardware structure of the radio device 1000, but may also correspond to functional elements, e.g., implemented by hardware, software, or a combination thereof.

It is to be understood that the methods of FIGS. 7 and 9 may also be combined in a system which includes one or more access nodes operating according to the method of FIG. 7 and one or more radio devices operating according to the method of FIG. 9.

Figure 11:
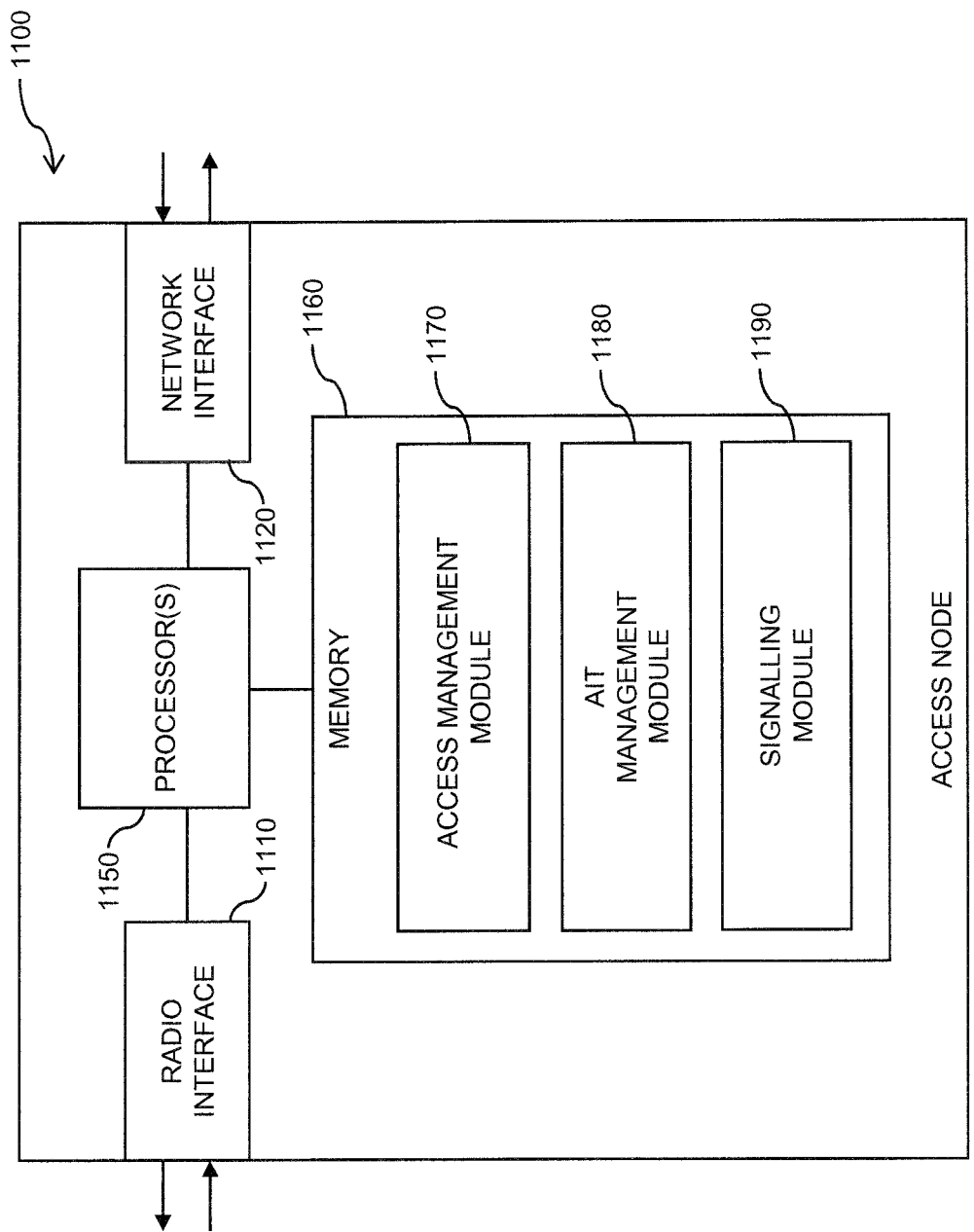
FIG. 11 schematically illustrates structures of an access node according to an embodiment of the invention.

FIG. 11 illustrates exemplary structures which may be used for implementing the above concepts in an access node 1100 of a cellular network, such as one of the access nodes 111, 112, 113, 114, 115.

As illustrated, the access node 1100 may include a radio interface 1110 for enabling access of one or more radio devices, such as the UEs 10, to the cellular network. Further, the access node 1100 may include a network interface 1120 for connecting to a core network part of the cellular network and/or to other access nodes.

Further, the access node 1100 may include one or more processors 1150 coupled to the interfaces 1110, 1120, and a memory 1160 coupled to the processor(s) 1150. The memory 1160 may include a ROM, e.g., a flash ROM, a Random Access Memory (RAM), e.g., a Dynamic RAM (DRAM) or Static RAM (SRAM), a mass storage, e.g., a hard disk or solid state disk, or the like. The memory 1160 includes suitably configured program code to be executed by the processor(s) 1150 so as to implement the above-described functionalities of an access node. In particular, the memory 1160 may include various program code modules for causing the access node 1100 to perform processes as described above, e.g., corresponding to the method steps of FIG. 7.

As illustrated, the memory 1160 may include an access management module 1170 for implementing the above-described functionalities of controlling access of a radio device to the cellular network, e.g., by performing a random access procedure or some other access procedure, based on access information selected from an AIT. Further, the memory 1160 may include an AIT management module 1180 for implementing the above-described functionalities of determining an AIT. Further, the memory 1160 may also include a signaling module 1190 for implementing the above-described functionalities of sending the timing information, of the identifier, and optionally of the AIT.

It is to be understood that the structures as illustrated in FIG. 11 are merely schematic and that the access node 1100 may actually include further components which, for the sake of clarity, have not been illustrated, e.g., further interfaces or processors. Also, it is to be understood that the memory 1160 may include further types of program code modules, which have not been illustrated, e.g., program code modules for implementing known functionalities of an access node. According to some embodiments, also a computer program may be provided for implementing functionalities of the access node 1100, e.g., in the form of a physical medium storing the program code and/or other data to be stored in the memory 1160 or by making the program code available for download or by streaming.

Figure 12:
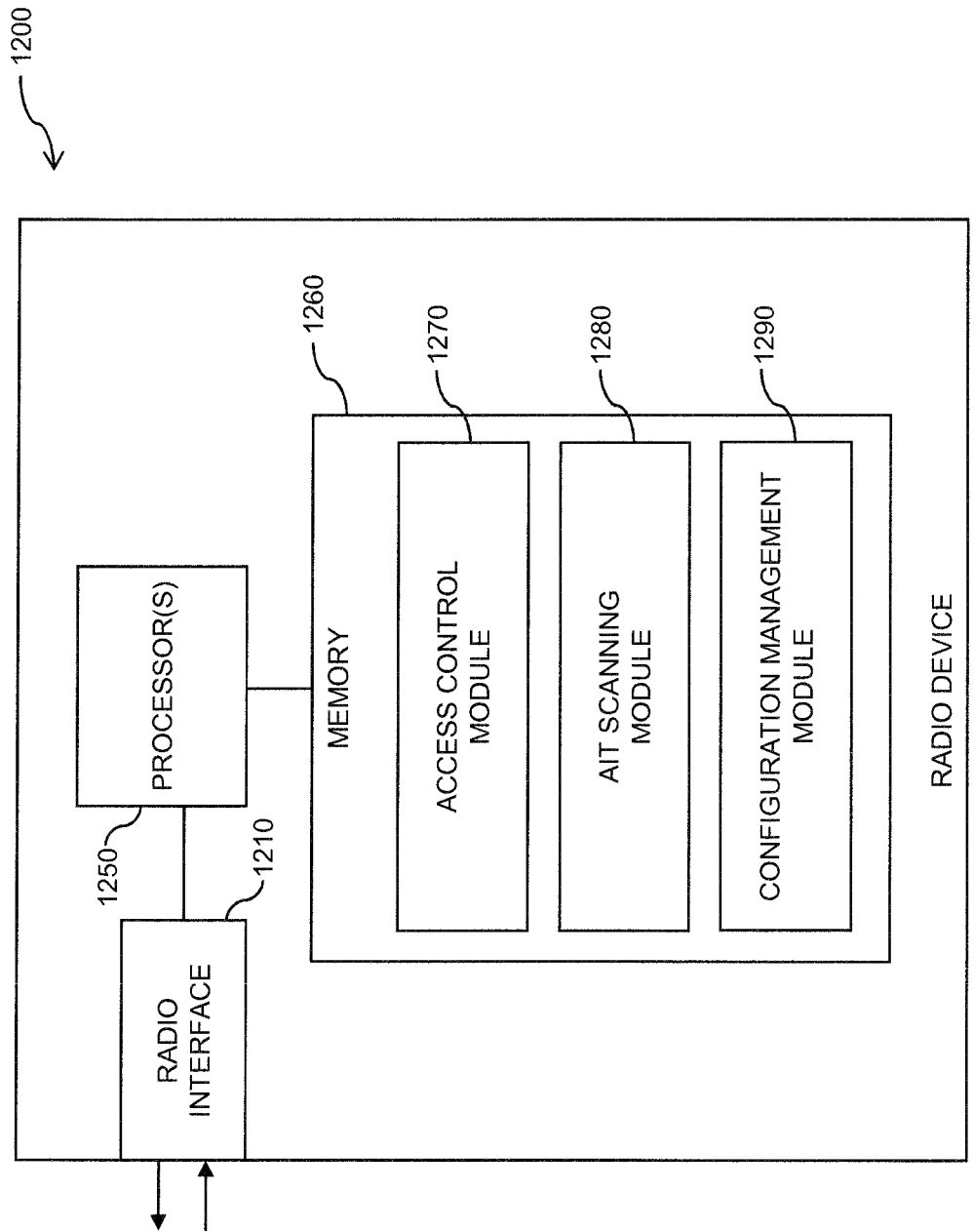
FIG. 12 schematically illustrates structures of a radio device according to an embodiment of the invention.

FIG. 12 illustrates exemplary structures which may be used for implementing the above concepts in a radio device 1200, such as one of the UEs 10. The radio device 1200 may for example correspond to a mobile phone or to some other type of portable or stationary computing device.

As illustrated, the radio device 1200 may include a radio interface 1210 for enabling access of the radio device 1200 to the cellular network. Further, the radio device 1200 may include one or more processors 1250 coupled to the interface 1210, and a memory 1260 coupled to the processor(s) 1250. The memory 1260 may include a ROM, e.g., a flash ROM, a RAM, e.g., a DRAM or SRAM, a mass storage, e.g., a hard disk or solid state disk, or the like. The memory 1260 includes suitably configured program code to be executed by the processor(s) 1250 so as to implement the above-described functionalities of a radio device. In particular, the memory 1260 may include various program code modules for causing the radio device 1200 to perform processes as described above, e.g., corresponding to the method steps of FIG. 9.

As illustrated, the memory 1260 may include an access control module 1270 for implementing the above-described functionalities of accessing the cellular network based on access information selected from an AIT. Further, the memory 1260 may include an AIT scanning module 1280 for implementing the above-described functionalities of scanning multiple carrier frequencies for AIT transmissions. Further, the memory 1160 may also include a signaling module 1290 for implementing the above-described functionalities of receiving the timing information, the AIT, and/or the identifier enabling selection of the access information from the AIT.

It is to be understood that the structures as illustrated in FIG. 12 are merely schematic and that the radio device 1200 may actually include further components which, for the sake of clarity, have not been illustrated, e.g., further interfaces or processors. Also, it is to be understood that the memory 1260 may include further types of program code modules, which have not been illustrated, e.g., program code modules for implementing known functionalities of a UE. According to some embodiments, also a computer program may be provided for implementing functionalities of the radio device 1200, e.g., in the form of a physical medium storing the program code and/or other data to be stored in the memory 1260 or by making the program code available for download or by streaming.

As can be seen, the concepts as described above may be used for efficiently controlling access to a cellular network. Specifically, the concepts may be used to efficiently organize transmission of AITs to radio devices. Based on the timing information, radio devices may adapt their operations depending on when transmission of an AIT is expected on a certain carrier frequency and thereby expedite reception of AITs from multiple carrier frequencies and/or save energy by entering a sleep mode while waiting for transmission of an AIT on a certain carrier frequency.

It is to be understood that the examples and embodiments as explained above are merely illustrative and susceptible to various modifications. For example, the illustrated concepts may be applied in connection with various radio technologies, without limitation to the above-mentioned example of a 5G radio technology. Further, the illustrated concepts may be applied in connection with various kinds of access nodes and radio devices. Further, the AIT may be organized in various ways, e.g., as a list of table entries, or as an array of information blocks including the table entries. Moreover, it is to be understood that the above concepts may be implemented by using correspondingly designed software to be executed by one or more processors of an existing device, or by using dedicated device hardware. Further, it should be noted that the illustrated nodes may each be implemented as a single device or as a system of multiple interacting devices.

The invention claimed is:

1. A method of controlling access to a cellular network, the method comprising:
receiving, by a radio device, on a first carrier frequency, first timing information indicating a time of a next transmission of a first access information table on the first carrier frequency, the first access information table comprising first access information to be applied by radio devices for accessing the cellular network, wherein the first timing information is repeatedly transmitted with a period, wherein the first timing information is distributed over a sequence of multiple transmissions, and wherein the first timing information comprises a countdown value indicating a remaining time until the next transmission of the first access information table; and
depending on the received first timing information, selecting, by the radio device, between:
waiting on the first carrier frequency until the time of the next transmission of the first access information table to receive the first access information table on the first carrier frequency; and
switching to a second carrier frequency.

2. The method of claim 1, wherein the radio device enters a sleep mode while waiting for the next transmission of the first access information table.

3. The method of claim 1, further comprising, after the switching to the second carrier frequency, switching, by the radio device, back to the first carrier frequency to receive the first access information table at the time of the next transmission of the first access information table.

4. The method of claim 1,
wherein the first access information table is repeatedly transmitted with a first period, and
wherein the period with which the first timing information is repeatedly transmitted is a second period which is shorter than the first period.

5. The method of claim 1, wherein the receiving comprises receiving, by the radio device, the first timing information in conjunction with a first identifier enabling selection of the first access information from the first access information table.

6. The method of claim 1, wherein the first timing information is at least in part encoded by selection of a scrambling sequence from a set of scrambling sequences.

7. The method of claim 1, further comprising, after switching to the second carrier frequency, receiving, by the radio device, second timing information on the second carrier frequency, the second timing information indicating a time of a next transmission of a second access information table on the second carrier frequency, the second access information table comprising second access information to be applied by the radio devices for accessing the cellular network.

8. The method of claim 7, further comprising, depending on the received first timing information and the received second timing information, selecting, by the radio device, between:
waiting on the second carrier frequency until the time of the next transmission of the second access information table to receive the second access information table on the second carrier frequency; and
switching back to the first carrier frequency to receive the first access information table at the time of the next transmission of the first access information table.

9. The method of claim 7, further comprising, depending on the received first timing information and the received second timing information, selecting, by the radio device, between:
waiting on the second carrier frequency until the time of the next transmission of the second access information table to receive the second access information table on the second carrier frequency;
switching back to the first carrier frequency to receive the first access information table at the time of the next transmission of the first access information table; and
switching to a third carrier frequency.

10. The method of claim 7, wherein the radio device enters a sleep mode while waiting for the next transmission of the second access information table.

11. A radio device, comprising:
processing circuitry; and
memory containing instructions executable by the processing circuitry whereby the radio device is operative to:
receive, on a first carrier frequency, first timing information indicating a time of a next transmission of a first access information table on the first carrier frequency, the first access information table comprising first access information to be applied by radio devices for accessing a cellular network, wherein the first timing information is repeatedly transmitted with a period, wherein the first timing information is distributed over a sequence of multiple transmissions, and wherein the first timing information comprises a countdown value indicating a remaining time until the next transmission of the first access information table; and depending on the received first timing information, select between:
  waiting on the first carrier frequency until the time of the next transmission of the first access information table to receive the first access information table on the first carrier frequency; and
  switching to a second carrier frequency.

* * * * *